(12) United States Patent
Legeai

(10) Patent No.: US 6,367,507 B1
(45) Date of Patent: Apr. 9, 2002

(54) FLUID-FLOW MODULE

(75) Inventor: Patrick Legeai, Javene (FR)

(73) Assignee: Legris SA, Paris (FR)

( * ) Notice: Subject to any disclaimer, the term of this patent is extended or adjusted under 35 U.S.C. 154(b) by 0 days.

(21) Appl. No.: 09/620,916

(22) Filed: Jul. 20, 2000

(30) Foreign Application Priority Data

Aug. 5, 1999 (FR) .......................................... 99 10193

(51) Int. Cl.$^7$ .............................................. F16K 27/00
(52) U.S. Cl. ...................................... 137/884; 137/360
(58) Field of Search ................................. 137/357, 360, 137/884; 285/61, 64

(56) References Cited

U.S. PATENT DOCUMENTS

| | | |
|---|---|---|
| 4,387,887 A | 6/1983 | Gentry |
| 4,683,941 A | 8/1987 | Timmer et al. |
| 5,460,204 A * | 10/1995 | Rossi ........................ 137/884 |
| 5,529,088 A * | 6/1996 | Asou .......................... 137/343 |
| 6,076,543 A * | 6/2000 | Johnson ...................... 137/15 |

FOREIGN PATENT DOCUMENTS

DE             9403437            1/1994

\* cited by examiner

*Primary Examiner*—John Fox
(74) *Attorney, Agent, or Firm*—Birch, Stewart, Kolasch and Birch, LLP

(57) ABSTRACT

A fluid-flow module comprising a support plate having two parallel opposite edges and at least one body fixed to the support plate, the body having a main duct extending substantially parallel to the support plate and having first and second ends respectively provided with a quick coupling and with a connection endpiece for engaging such a quick coupling, the quick coupling and the connection endpiece extending parallel to said opposite edges of the support plate and at least one of the quick coupling and the connection endpiece extending at least in part beyond the support plate.

6 Claims, 3 Drawing Sheets

FIG_1

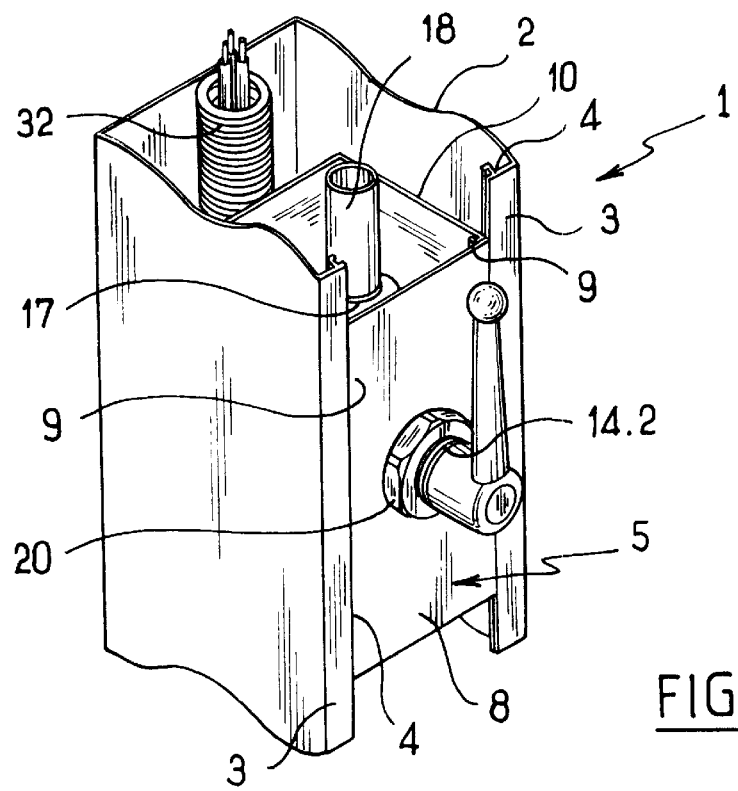
FIG_3
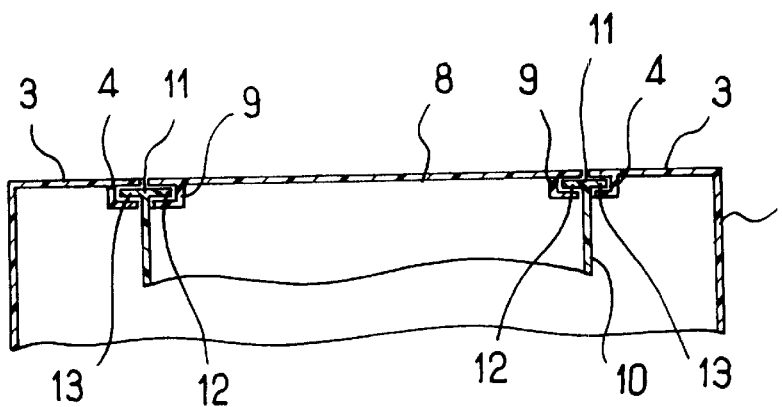
FIG_4
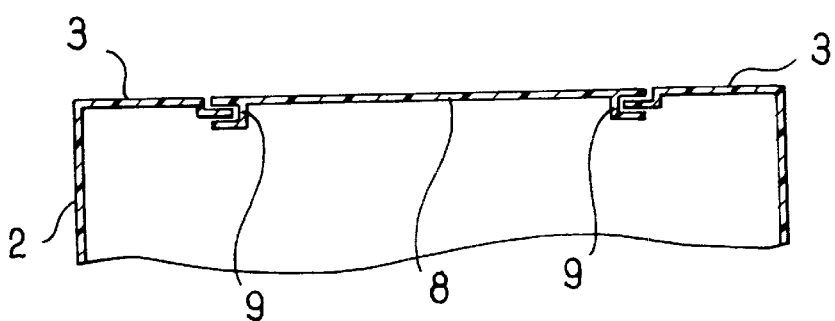
FIG_5

FLUID-FLOW MODULE

The present invention relates to a fluid-flow module suitable in particular for making up fluid distribution assemblies, and more particularly assemblies for distributing compressed air.

BACKGROUND OF THE INVENTION

It is known to make unit pneumatic distribution assemblies directly in the factory by interconnecting various functional pneumatic elements (such as valves, pressure gauges, outlet terminals, . . . ) in a single housing. Either the configurations assembled are specific for the needs of a client, where such assemblies are made individually and are therefore relatively expensive, or else the configurations are predetermined to form standard assemblies, which assemblies can be mass-produced and are therefore much less expensive, but do not always satisfy the needs of the client.

It would therefore be advantageous to have functional fluid-flow elements available that can be arranged to form distribution assemblies that can be adapted simply by being modular in structure.

OBJECTS AND SUMMARY OF THE INVENTION

To this end, the invention provides a fluid-flow module, comprising a support plate having two parallel opposite edges and at least one body fixed to the support plate, the body having a main duct extending substantially parallel to the support plate and having first and second ends respectively provided with a quick coupling and with a connection endpiece for engaging such a quick coupling, the quick coupling and the connection endpiece extending parallel to said opposite edges of the support plate and at least one of the quick coupling and the connection endpiece extending at least in part beyond the support plate.

Thus, the fluid-flow modules can be mounted on a frame such as a section member, in alignment with each other by means of the parallel opposite edges of their support plates, and they can be connected to one other merely by engaging the connection endpiece of one of them into the quick coupling of another without requiring any direct intervention on the coupling means and without requiring any special tooling. The fluid-flow modules are advantageously mounted so that the parallel opposite edges of their support plates co-operate with the section member to slide along a longitudinal direction thereof. The modules are thus brought up against one another by sliding, and coupling takes place automatically.

BRIEF DESCRIPTION OF THE DRAWINGS

Other characteristics and advantages of the invention will appear on reading the following description of particular but non-limiting embodiments of the invention.

Reference is made to the accompanying drawings, in which:

FIG. 3 is a perspective view of a fluid-flow module installed in the distribution assembly of FIG. 1;

FIG. 4 is a fragmentary diagrammatic view in cross-section of the distribution assembly of FIG. 1 showing more particularly how modules are fixed; and FIG. 5 is a view analogous to FIG. 4 showing a distribution assembly made up of fluid-flow modules constituting a second embodiment of the invention.

MORE DETAILED DESCRIPTION

Figure 1:
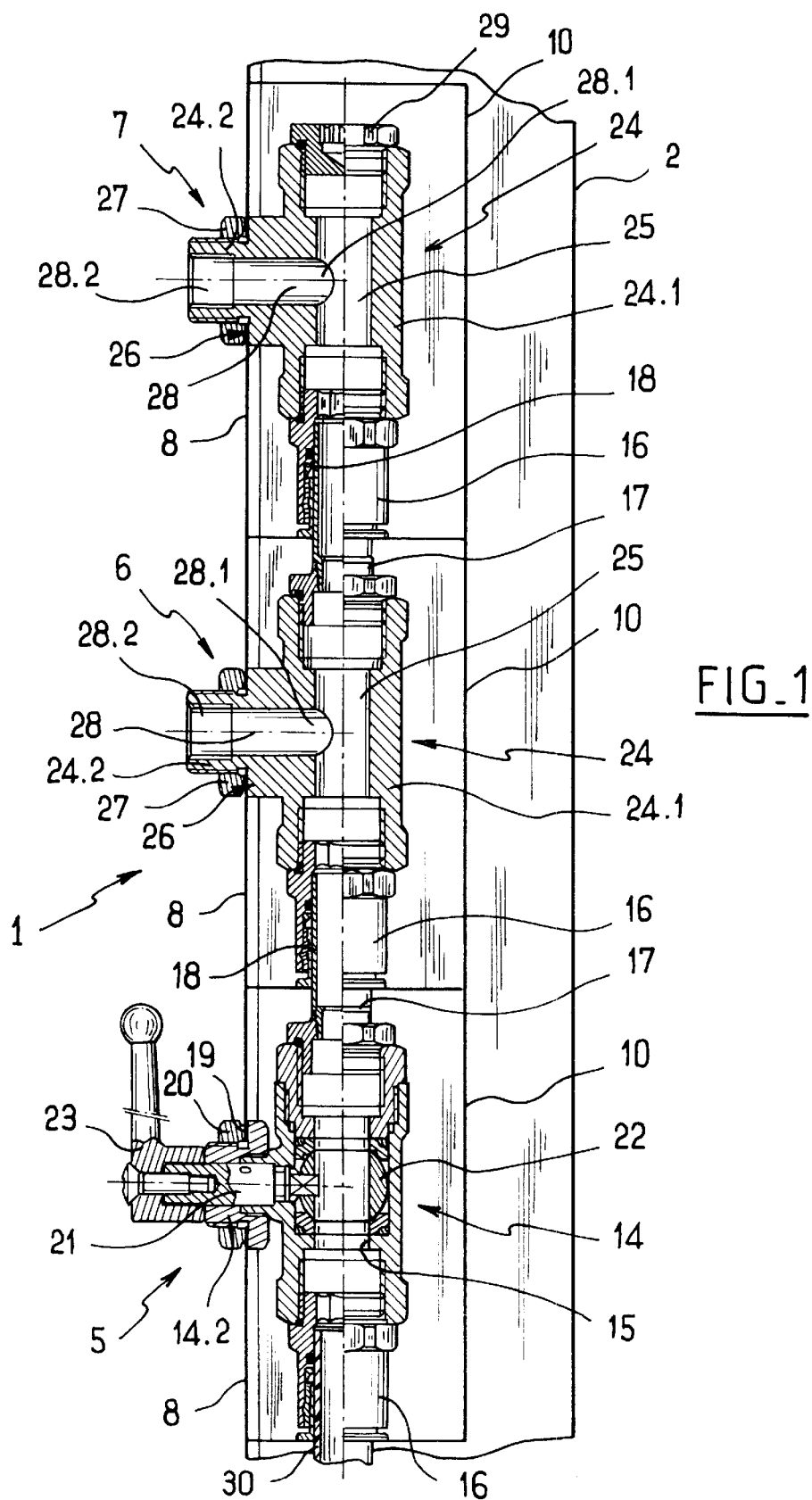
FIG. 1 is a fragmentary longitudinal section view of a distribution assembly made up of fluid-flow modules in accordance with a first embodiment of the invention.
Figure 2:
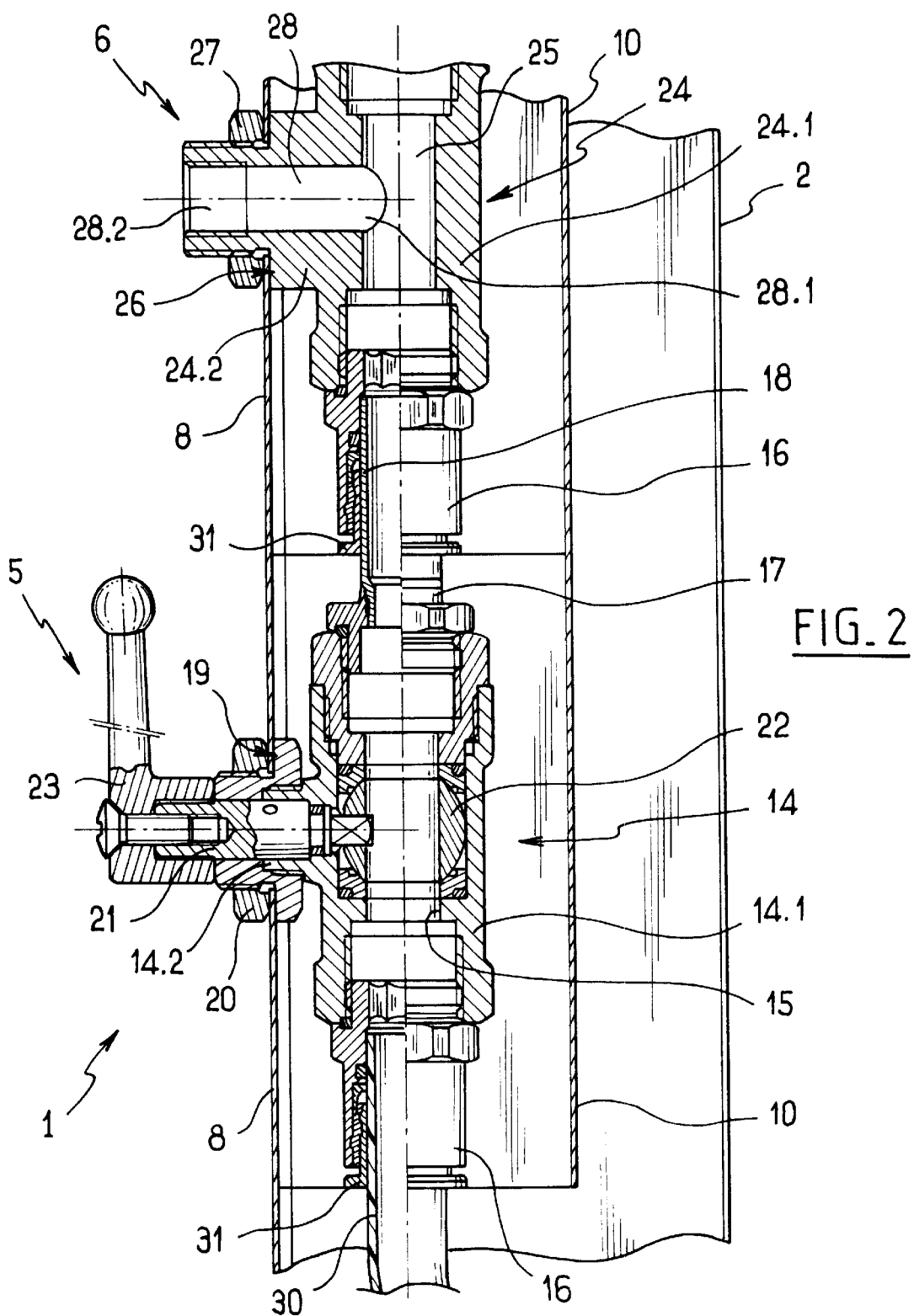
FIG. 2 is a view of a portion of FIG. 1 on a larger scale.

FIGS. 1 to 4 show a distribution assembly given overall reference 1, which assembly comprises a channel-section section member 2 forming a channel for fixing to a support such as a piece of furniture or a wall. The section member 2 has longitudinal rims 3 defining between them a slot and having free edges 4 in the form of slideways that face each other. The section member 2 is made of plastics material or of metal such as aluminum.

In this case, the distribution assembly 1 comprises a valve module, a branch module, and an end module, given respective overall references 5, 6, and 7, and each releasably fixed to the section member 2.

Each module 5, 6, and 7 comprises a rectangular support plate 8 having two parallel opposite edges in the form of slideways 9 facing out from the support plate 8.

Each module 5, 6, and 7 also has a channel 10 of U-shaped cross-section and having the same length as the support plate 8, forming a housing with two free longitudinal edges 11 along each of which there runs firstly, on the inside of the channel 10, a rim 12 received in the corresponding slideway 9 of the support plate 8, and secondly, on the outside of the channel 10, a rim 13 received in the corresponding slideway 4 of the section member 2.

The valve module 5 comprises a body 14 having a tubular longitudinal portion 14.1 defining a main duct 15 which extends parallel to the support plate 8 and which possesses one end into which a quick coupling 16 of conventional type is screwed and an opposite end into which a connection endpiece 17 is screwed. The quick coupling 16 and the connection endpiece 17 extend in line with each other parallel to the opposite edges 9 of the plate 8. In this case, the free end of the quick coupling 16 is flush with the end of the support plate, however it could extend beyond it. The connection endpiece 17 possesses a free end portion 18 which extends beyond the support plate 8 so as to be engaged in a quick coupling identical to the quick coupling 16.

The body 14 has a threaded transverse portion 14.2 extending perpendicularly to the longitudinal portion 14.1 and passing through the support plate 8. The transverse portion 14.2 has a shoulder 19 adjacent to the longitudinal portion 14.1 of the body 14 and against which the support plate 8 is pressed by a nut 20 engaged on the transverse portion 14.2 from the side of the support plate 8 opposite from the shoulder 19 and the longitudinal portion 14.1.

The transverse portion 14.2 is tubular and forms a housing for a drive rod 21 having one end secured to a shutter element 22 for shutting the main duct 15 and an opposite end that projects from the transverse portion 14.2 and which has a handle 23 removably secured thereto.

The branch module 6 comprises a body 24 having a tubular longitudinal portion 24.1 defining a main duct 25 which extends parallel to the support plate 8 and which possesses one end into which a quick coupling 16 is screwed and an opposite end into which a connection endpiece 17 is screwed. As with the valve module 5, the quick coupling 16 and the connection endpiece 17, which are identical to those of the valve module 5, extend in line with each other parallel to the opposite edges 9 of the plate 8, and the connection endpiece 17 possesses a free end portion 18 which projects beyond the support plate 8.

The body 24 has a threaded transverse portion 24.2 extending perpendicularly to the longitudinal portion 24.1 and passing through the support plate 8. The transverse portion 24.2 has a shoulder 26 adjacent to the longitudinal portion 24.1 of the body 24 and held pressed against the support plate 8 by a nut 27 engaged on the transverse portion 24.2 from the side of the support plate 8 that is opposite from the shoulder 26 and the longitudinal portion 24.1.

The transverse portion 14.2 is tubular and forms a branch duct 28 having an end 28.1 opening out into the main duct 25 and an opposite end 28.2 which opens out on the side of the support plate 8 that is opposite from the longitudinal portion 24.1 and which is tapped so as to enable it to be coupled to an element (not shown) such as a pressure gauge or a pneumatic appliance.

The end module 7 is identical to the branch module 6 except that its connection endpiece 17 is replaced by a plug 29.

In this case the section member 2 is fixed vertically on a support, and for the configuration shown, modules are assembled therein starting by putting the valve module 5 into place in the section member 2. The outer rims 13 of the channel 10 are inserted successively into the slideways 4 of the section member 2 by moving them a little apart from each other, which is made possible by the resilience of the section member 2, so that the quick coupling 16 extends towards a compressed air feed pipe 30 shown in the figures as being at the bottom of the section member 2. The valve module 5 is then slid along the slideways 4 until the quick coupling 16 connects to the compressed air feed pipe 30 and comes into abutment, e.g. against an electrical module or against a closure plate for closing the section member 2 and previously installed on the section member 2.

The branch module 6 and the end module 7 are put into place in succession on the section member 2 in the same manner.

The branch module 6 is slid in the slideways 4 until the bottom ends of the plate 8 and of the channel 10 of said module come to bear against the top ends of the plate 8 and the channel 10 of the valve module 5, with connection between the connection endpiece 17 of the valve module 5 and the quick coupling 16 of the branch module 6 taking place automatically. In this context, it will be observed that the length of the free end portion 18 of the connection endpiece 17 projecting beyond the support plate 8 is determined in such a manner that when two modules have their plates 8 and their channels 10 making contact with one another, the free end portion 18 of the connection endpiece 17 of one of the modules is sufficiently engaged in the quick coupling 16 of the other module to ensure leakproof coupling between the modules.

The end module 7 for coupling to the branch module 6 is engaged in the same manner.

It will be observed more particularly in FIG. 3 that the gap which exists between the channels 10 of the modules 5, 6, and 7, and the section member 2 is sufficient to leave room to pass electric cables such as the cable referenced 32. Pneumatic modules and electrical modules can thus be installed on a single section member 2, thereby advantageously reducing bulk compared with the prior art where electrical and pneumatic distribution assemblies are separate and juxtaposed.

One or more modules can be removed by withdrawing the nut for fixing to the support plate 8 (which in the example of the valve module 5 requires the handle 23 to be removed beforehand) and then disengaging the support plate 8 from the slideways 4 of the section member 2. The release pusher 31 of the quick coupling 16 of the or each module in question is then accessible so that by depressing the release pusher and sliding said modules relative to one another in the slideways 4 of the section member 2, it is possible to disconnect one of the modules.

In a variant, and as shown in FIG. 5, the modules do not have a housing-forming channel. The rims 3 of the section member 2 are then engaged directly in the slideways 9.of the support plate 8.

Naturally, the invention is not limited to the embodiment described and variants can be applied thereto without going beyond the ambit of the invention as defined by the claims.

In particular, the invention is not limited to valve modules or branch modules, but is applicable to components that perform other functions. Modules for regulating flow rate or pressure, emergency stop modules, . . . could equally well be made. The invention is also not limited to assemblies for pneumatic distribution.

Furthermore, modules can be mounted directly on supports such as pieces of furniture.

What is claimed is:

1. A fluid-flow module, comprising a support plate having two parallel opposite edges and at least one body fixed to the support plate, the body having a main duct extending substantially parallel to the support plate and having first and second ends respectively provided with a quick coupling and with a connection endpiece for engaging such a quick coupling, the quick coupling and the connection endpiece extending parallel to said opposite edges of the support plate and at least one of the quick coupling and the connection endpiece extending at least in part beyond the support plate, wherein the module comprises releasable fixing means for fixing the body to the support plate and disposed on the side of the support plate that is opposite from the body, and the body has a transverse portion extending perpendicularly to the main duct to pass through the support plate, the releasable fixing means being engaged on the transverse portion to clamp the support plate against a shoulder of the transverse portion.

2. The fluid-flow module according to claim 1, wherein said opposite edges of the support plate are provided with means for forming slideway connections with free longitudinal edges of a first channel.

3. The fluid-flow module according to claim 2, wherein each of said opposite edges of the support plate forms a slideway facing towards the outside of the support plate for receiving an inside rim running along the corresponding free longitudinal edge of the first channel on the inside thereof.

4. The fluid-flow module according to claim 3, wherein each free longitudinal edge of the first channel has an outside rim running along the free longitudinal edge on the outside of the first channel to be received in a slideway secured to a free longitudinal edge corresponding to a second channel.

5. The fluid-flow module according to claim 1, including a drive member mounted on a transverse portion of the body and connected to a member for shutting the main duct.

6. The fluid-flow module according to claim 1, wherein a transverse portion of the body is tubular and defines a branch duct opening out into the main duct.

* * * * *